J. RIPCZINSKE.
PNEUMATIC COW MILKER.
APPLICATION FILED NOV. 15, 1910.
1,008,368.
Patented Nov. 14, 1911.
2 SHEETS—SHEET 1.
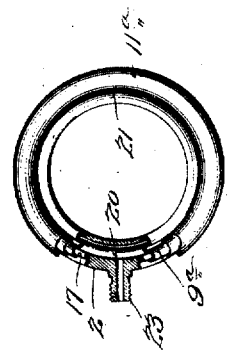
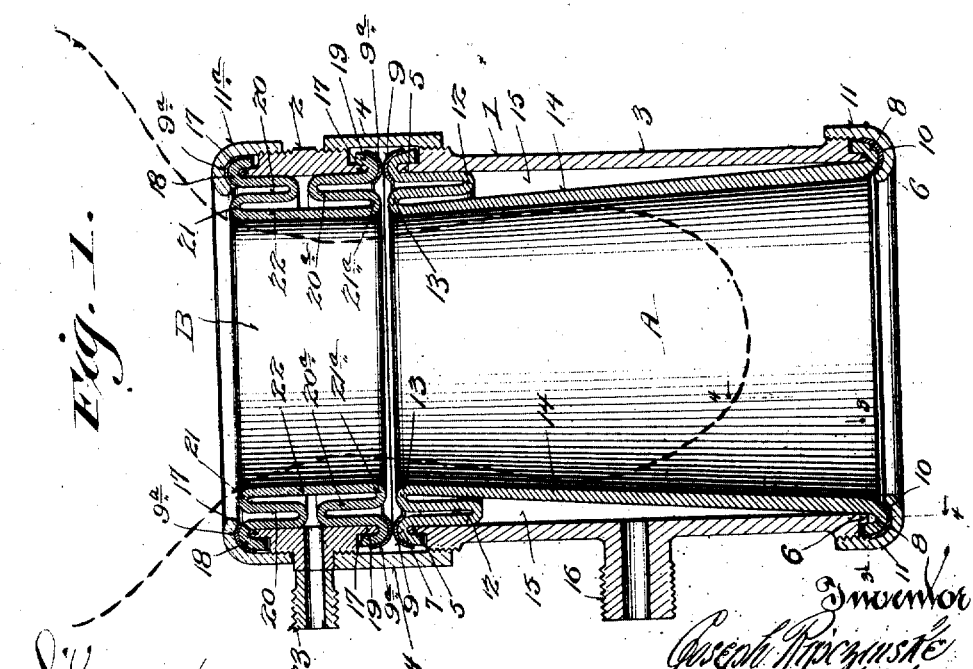

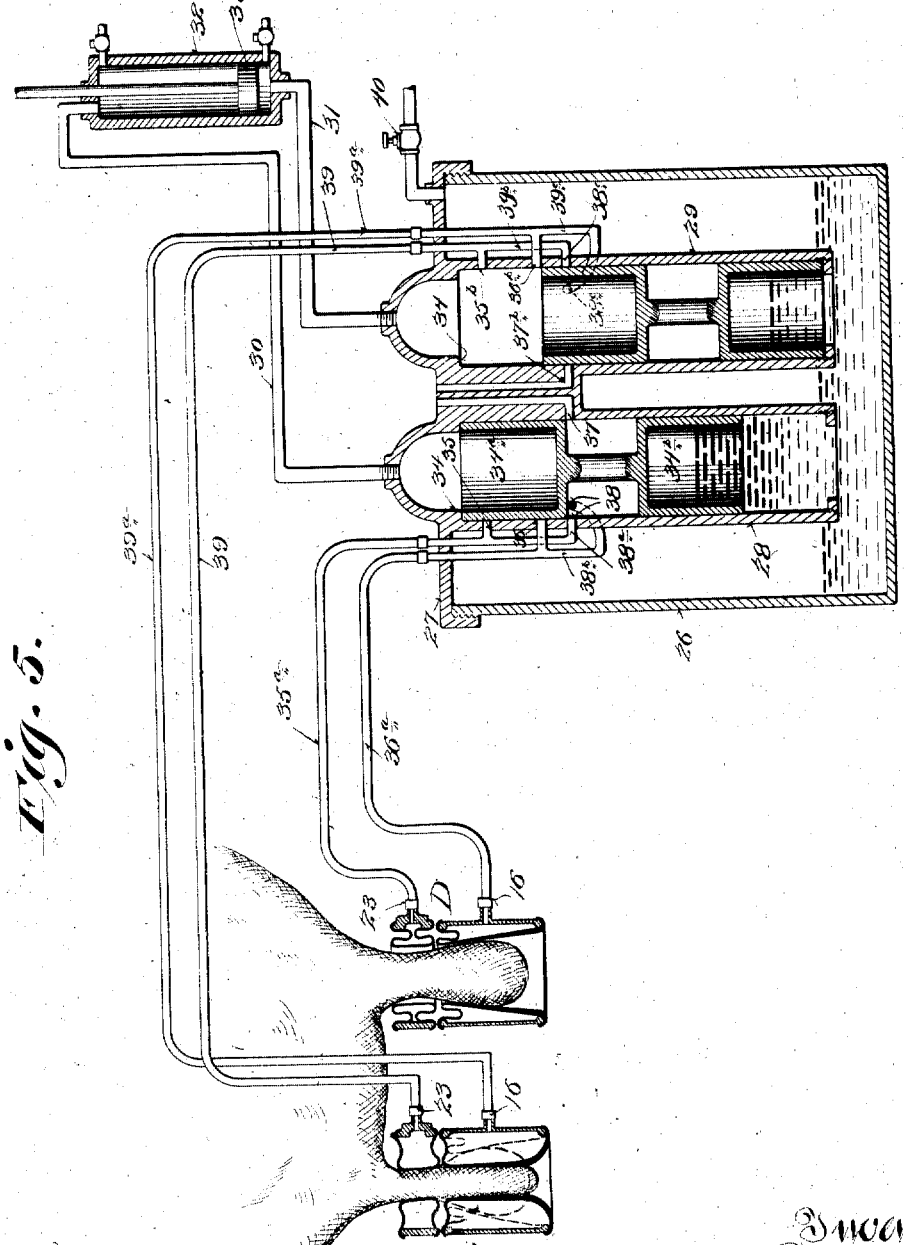

UNITED STATES PATENT OFFICE.

JOSEPH RIPCZINSKE, OF WAUSAU, WISCONSIN

PNEUMATIC COW-MILKER.

1,008,368.  Specification of Letters Patent.  Patented Nov. 14, 1911.

Application filed November 15, 1910. Serial No. 592,581.

*To all whom it may concern:*

Be it known that I, JOSEPH RIPCZINSKE, a citizen of the United States, and resident of Wausau, in the county of Marathon and State of Wisconsin, have invented certain new and useful Improvements in Pneumatic Cow-Milkers; and I do hereby declare that the following is a full, clear, and exact description thereof.

My invention refers to cow-milkers of the pneumatic type wherein the teats of a cow are incased in membraneous jackets, which membranes are under air control, said invention consisting in certain peculiarities of construction and combination of parts as set forth hereinafter with reference to the accompanying drawings and subsequently claimed.

The primary object of my invention is to provide a simple, durable, sensitive and effective membrane adapted to respond positively to pneumatic control with the expenditure of a minimum air pressure. The arrangement and construction of the membranes are such that the elasticity of the material from which they are constructed is not depended upon in the performance of its function, while said membranes at the same time are capable of expanding to initially grip the teat at its base followed by gradual expansion from said base to dispel milk contained in the teat in a manner similar to that performed by hand, this action being in some instances due to the fact that the membranes are formed so as to provide separate air chambers.

Another object is to provide an automatically controlled valve-mechanism that is interposed between and connected to an air supply pump and the several chambers of the membranes constituting a milking set, whereby air is successively admitted and exhausted from said chambers in synchrony with the pump action.

In the drawings Figure 1 represents a longitudinal sectional view of a shell having a membraneous lining embodying the features of my invention, the illustration being upon a magnified scale to more clearly illustrate structural features; Fig. 2, a plan view of the same with parts broken away and parts in section to more clearly illustrate certain details of construction; Fig. 3, a detail sectional plan view of the beaded edge of one of the membranes, the section being indicated upon lines 3—3 of Fig. 1; Fig. 4, a detail section in elevation of the same as indicated by line 4—4 of Fig. 1, and Fig. 5, a diagrammatic sectional view of the apparatus as a whole showing the manner of connecting a pair of the membranes, valve-mechanism and pump.

Referring by characters to the drawings, 1 indicates a sectional cylindrical shell, the upper ring portion 2 of which is connected to the lower portion 3 by a coupling ring 4 that is in threaded connection with adjacent ends of the two shell sections, the said shell being in separate sections for the purpose of convenience in assembling the device. The ends of the lower shell section are provided with annular flanges 5, 6, respectively, over which are fitted beaded terminals 7, 8, of a circular membrane A, which is preferably composed of molded rubber. Thus said terminals firmly grip the shell ends and are crowned with concavo-convexed washers 9 and 10 respectively. Fitted over the washer 10 is a spanner ring 11, which spanner ring securely binds the bottom end of the membrane to the shell by means of a threaded connection therewith. The upper end of the membrane A is shaped so as to form an annular depending fold 12 that extends from the beaded terminal 7, the upper end of the fold being recurved as at 13, from which point it merges into a straight membrane wall 14 that extends downwardly to the lower beaded terminal 8, the said wall being gradually increased in thickness from its upper to its lower end. Thus when this membrane is inserted in its shell section an air-tight chamber 15 is formed between the membrane wall and adjacent wall of said shell, into which chamber an air inlet nipple 16 communicates, the nipple being adapted to receive a pipe that is connected to a suitable source of air-supply to be hereinafter described.

The ring section 2 of the shell is provided with terminal flanges 17, over which are fitted beaded terminals 18, 19, of a second membrane B. These beaded terminals are capped by washers 9ª that are similar to those described in connection with the lower membrane A. The upper beaded terminals of the membrane B and its washer are held in place by a spanner 11ª that is in threaded connection with the shell-ring 2. The upper membrane is provided with annular folds 20 and 20ª that extend toward each other from the beaded terminals 18, 19, the outer ends of the folds being recurved as at 21, 21ª, from which points they merge into a straight band or wall 22, which wall is circular in cross-section, conforming to the corresponding wall 14 of the lower membrane, the lower membrane constituting a continuation thereof with its walls flared slightly in an outwardly direction, as shown, from the upper membrane B. The upper membrane also, in connection with the inner wall of the ring, forms an air chamber that is tapped by a threaded nipple 23 for the purpose of attaching an air pipe thereto.

After the membranes have been placed within the separate shell sections they are connected by the coupling ring 4, which ring draws said sections together, whereby the washers 9 and 9ª of the respective membranes are abutted and thus a tight joint is formed at these points by the flanges 5 and 17 which impinge against the beaded terminals of their respective membranes, as shown.

The several sets of washers fitted over the beads of the membrane are provided for the purpose of preventing twist and wear of the same when the coupling ring and spanner rings 11, 11ª are adjusted. Further provision for holding the beads of the membranes in place is by two or more cross webs 24 that connect the outer and inner edges of the beads, these cross webs, as shown in Figs. 3 and 4, being adapted to fit within kerfs 25 that are formed in the several flanges.

By utilizing a shell provided with a membraneous lining of the character described it is understood that, should air pressure be admitted to the chamber of the upper membrane, the same will expand and cause the wall 22 of said membrane to securely grip the base of a teat and after the teat is so gripped, if air under pressure is admitted to the lower membrane, its chamber 15 will expand and first cause an expansion of the upper end of said membrane, which expansion is similar in proportions to that of the upper membrane. Owing to the variation in thickness of the wall 14 of the lower membrane, the resistance to the air pressure is gradually increased from top to bottom and hence this resistance will cause a gradual expansion of the membrane in the same direction, that results through yield of the fold, whereby all milk that is within the teat will be expelled. Thus the upper membrane compresses the teat at the base and prevents back flow of the milk, while the lower membrane gradually expels it, starting from the base to the end of said teat. The quick response to air pressure by the membranes is due to the folds that permit the upper end of the lower membrane and the entire upper membrane to contract about the teat without stretch of the material. Thus said membranes operate upon the principle of a bellows. It is obvious that when the air pressure is relieved within the chambers formed by the membranes that the same will contract to their normal position, assuming their original molded shape, as shown in Fig. 1, means for producing the contraction and expansion in connection with a pump being hereinafter described.

Referring to the diagram view, Fig. 5, a pair of the membraneous shells, C, D, are shown adjusted to the teats of a cow, it being understood that the pair shown are single members of two sets, although, in some instances, it is apparent that the devices may be operated singly if desired. In the diagram, 26 represents a cup provided with a cap 27 in screw-threaded connection therewith, whereby a closed chamber is formed. The cap carries a pair of cylinders 28, 29, respectively, that have shouldered open bottoms terminating adjacent to the bottom of the cup, the upper ends of the cylinders being closed and arranged to receive pipes 30, 31, which pipes are connected to the upper and lower ends of a pump cylinder 32, the cylinder being provided with a reciprocative piston 33. The upper end of each cylinder is shouldered as at 34 and between this shoulder and lower shouldered end thereof is fitted a floating piston having an upper head 34ª and a lower head 34ᵇ in stem connection, whereby the same are spaced apart. Just below the shoulder 34 of cylinder 28 and communicating therewith, is an air-port 35, there being other air-ports 36 and 37 communicating with the cylinder and spaced from the first air-port at a predetermined distance. The air-ports 35 and 36 are adapted to admit air to the upper and lower chambers of the shell membrane D, being connected thereto by pipes 35ª and 36ª, which pipes are in threaded engagement with the nipples 23 and 16 respectively. The port 37 extends through the cup-cap and is open to atmosphere, said port comprising an air exhaust, which exhaust operates in conjunction with a pair of similar exhaust ports 38 that communicate with the cylinder and are horizontally alined with the port 37. One of the ports 38 is connected by a branch pipe 38ª to pipe 35ª, and the other exhaust port 38 is connected to pipe 36ª by a branch pipe 38ᵇ. The companion cylinder 29 is a duplicate of the cylinder just described, being provided with air discharge ports 35ᵇ and 36ᵇ, and an exhaust port 37ᵇ that communicates with a pair of exhaust ports 38ᶜ, which ports correspond to the pair of exhaust ports 38ª in the opposite cylinder. The ports 35ᵇ and 36ᵇ are connected by pipes 39, 39ª to the nipples 23 and 16 of the membraneous shell C, the said pipes being each connected to an exhaust port 38ᶜ by branch pipes 39ᵇ and 39ᶜ.

The cup 26 is partially filled with oil or other fluid to a level above the open ends of the cylinders, whereby a seal is formed therefor, the chamber above the oil being filled with compressed air that is admitted through a valve-controlled pipe 40, which leads from any suitable source of supply. As shown, when air pressure is admitted to the cup, the oil will be forced upward above the surrounding level until a balance of the pressure is obtained within the cylinders and hence when there is no action of the pump, the floating pistons will both be forced upward by the constant air pressure until their heads 34ª are checked by the shoulders 34, the air between the oil and head 34ᵇ serving as an elastic cushion for accomplishing this result. When the valve mechanism and pump illustrated in the diagram are in the positions shown, the pump piston is approaching the end of its downward stroke. The downward stroke of the pump piston forces air into the upper end of the cylinder 29, causing the piston to move downward. The first movement of the piston cuts off communication between the exhaust ports 37ᵇ and the pair of ports 38ᶜ. The upper end of said piston will next expose port 35ᵇ. Thus compressed air from the pump will be admitted through pipe 39 to the chamber of the upper membrane of that shell to which it is connected. This causes an expansion of the said membrane, resulting in a contraction of its inner wall 22 about the base of the teat, whereby milk is cut off at this point. The piston continues its movement slowly downward due to the resistance of the cushion of air thereunder and just as it is seated against the shouldered open end of said cylinder, it exposes the air discharge port 36ᵇ and thus places the same in communication with the pump, whereby air is admitted to the lower membrane through pipe 39ª, causing the same to contract about the bottom portion of the teat and expel the milk therein by gradual contraction of the bottom of the upper membrane to the end of the teat. Upon the reverse stroke of the pump piston, air will be admitted to the upper end of the cylinder 28, which will operate the floating piston contained therein in the same manner, and simultaneous with this upward movement of the piston, its suction stroke will relieve the pressure in the upper end of cylinder 29, whereby its piston will immediately close against the upper shoulder 34 thereof, due to the action of air under pressure within the bottom of the cylinder. Thus communication between the exhaust port 37ᵇ and pair of exhaust ports 38ᶜ will be established through the cylinder, whereby communication is had to the atmosphere and both membranes will be relieved of compressed air thereby causing the same to assume their normal positions.

From the foregoing described operation it will be seen that the alternate strokes of the pump piston will thus cause a corresponding alternate movement of the floating pistons, whereby milk will be expelled successively from the teats and if two pairs of shells are used, which comprise a set, each pair would be connected to the pairs of air pipes 35ª, 36ª and 39, 39ª, respectively, and as the floating piston that controls each set of ports moves slowly downward, a milking operation is effected. Furthermore, it should be understood, that, while rubber is the preferable material for use in manufacturing the membranes, that other material can be substituted therefor without departing from the spirit of my invention and, in some instances, non-flexible material may be utilized due to the action of the folds, which permit contraction without stretch, particular attention being called to the fact that the upper folded end of the lower membrance A provides sufficient surplus material that due to its infolding action, will permit contraction of the inner wall 14 first at the top and thereafter said wall is capable of contracting throughout its entire length without appreciable yield or stretch of the material. This is accomplished by give of the fold, the slack of which may be taken up by a wave, in a downwardly direction throughout the entire length of the wall, whereby compensation is obtained. Thus the air pressure would first contract the upper portion of this membrane and thereafter draw upon the surplus material in the fold for the contraction of the lower portion, which would tend to straighten out this fold or shorten the same until sufficient fullness had been distributed to the lower end, in order to permit contraction and this membrane may, in some cases, be used as a substitutet for the two membranes previously described. When so used the upper end of the membrane will exert a pressure upon the teat base first and thereafter progressively contract the teat, the upper portion of the membrane serving to check back flow of milk in the glands. It is also within the scope of my invention to provide a series of horizontally disposed membranes having a double fold, each membrane of the series being provided with a valve-mechanism similar to that described and illustrated in the diagram whereby a succession of gripping movements thereof is obtained from the base membrane downward.

I claim:

1. A cow-milker comprising a shell, and a one-piece membraneous lining surrounding the inner walls of the same, the membraneous lining being provided at its upper end with a tubular contractible and expansible continuous outer fold, the walls of the lining being increased in thickness from said fold toward its lower portion.

2. A cow-milker comprising a tubular one-piece membrane having an inner wall terminating with outwardly folded ends, a shell disposed about the folds, and means for securing the shell and fold ends together.

3. A cow-milker comprising a tubular one-piece membrane having an inner wall, one end of which terminates with an outer fold, a shell disposed about the membrane, and means for securing the ends of the membrane to the shell.

4. A cow-milker comprising a tubular one-piece membrane having an inner wall terminating with double folds at its top and bottom, the ends of the folds being provided with annular beads, a shell disposed about the fold, and means for securing the shell and beaded fold ends of the membrane together.

5. A cow-milker comprising a tubular membrane having separate inner wall sections that are merged into a plurality of folds, and a shell disposed about the folds to form separate air chambers.

6. A cow-milker comprising a band-like tubular membrane having an inner wall the terminals of which are merged into outer folds, a second tubular membrane having its end adjacent to the first membrane merged into an outer fold, a shell disposed about the membranes, and means for securing the ends of said membranes to the shell, whereby separate air-chambers are formed.

7. A cow-milker comprising a band-like tubular membrane having an inner wall that is merged into oppositely disposed folds terminating with open ends, a second membrane located below the first named membrane having an inner wall increasing in thickness progressively from said first named membrane, the thin upper wall end of the last named membrane being merged into a fold, a shell disposed about said membranes, and means for securing the ends of the membranes to the shell whereby air chambers are formed.

8. A cow-milker comprising an open end shell section, a membraneous lining secured to the open ends of the shell section, the lining being provided at one end with an outer fold, a second open end shell section secured to the first named shell section, a membraneous lining secured to the last named section, the lining being of comparatively slight width relative to the first named lining, the terminals of the lining being merged into outer folds.

9. In a pneumatic cow-milker apparatus having a shell provided with a membraneous lining; the combination of a closed cup, means for maintaining a constant fluid pressure in said cup, a cylinder located within the cup, the cylinder being provided with an open end communicating with the cup, a floating piston mounted within the cylinder, a pump in communication with the top of the cylinder arranged to exert pressure upon said piston in opposition to the fluid pressure within the cup, and an air discharge and exhaust port in communication with the cylinder and shell under control of said piston.

10. In a pneumatic cow-milker apparatus having pairs of shells provided with upper and lower membraneous lining sections forming separate air chambers with relation to the shells; the combination of a pair of cylinders, a floating piston mounted in each cylinder, constant pressure means in opposition to the pistons in one direction, a double-acting pump having a separate communication with each cylinder arranged to exert pressure upon said pistons alternately in opposition to the constant pressure means, a pair of air distributing ports communicating with each cylinder and separate chambers of one of the shells, and air exhaust ports in each cylinder in communication with each pair of shell chambers, all of which cylinder air ports are under control of their respective pistons.

In testimony that I claim the foregoing I have hereunto set my hand at Milwaukee in the county of Milwaukee and State of Wisconsin in the presence of two witnesses.

JOSEPH RIPCZINSKE.

Witnesses:
GEO. W. YOUNG,
CASANARE YOUNG.